US009668130B2

(12) United States Patent
Bournelle et al.

(10) Patent No.: US 9,668,130 B2
(45) Date of Patent: May 30, 2017

(54) PUTTING IN PLACE A SECURITY ASSOCIATION OF GBA TYPE FOR A TERMINAL IN A MOBILE TELECOMMUNICATIONS NETWORK

(75) Inventors: Julien Bournelle, Paris (FR); Lionel Morand, Malakoff (FR)

(73) Assignee: ORANGE, Paris (FR)

( * ) Notice: Subject to any disclaimer, the term of this patent is extended or adjusted under 35 U.S.C. 154(b) by 416 days.

(21) Appl. No.: 14/008,876

(22) PCT Filed: Mar. 27, 2012

(86) PCT No.: PCT/FR2012/050632
§ 371 (c)(1),
(2), (4) Date: Dec. 9, 2013

(87) PCT Pub. No.: WO2012/168603
PCT Pub. Date: Dec. 13, 2012

(65) Prior Publication Data
US 2014/0096192 A1    Apr. 3, 2014

(30) Foreign Application Priority Data
Mar. 31, 2011 (FR) ..................... 11 52709

(51) Int. Cl.
*H04W 12/06* (2009.01)
*H04L 9/32* (2006.01)
*H04L 29/06* (2006.01)
*G06K 5/00* (2006.01)
*H04W 12/08* (2009.01)

(52) U.S. Cl.
CPC ............ *H04W 12/06* (2013.01); *H04L 9/321* (2013.01); *H04L 63/102* (2013.01); *G06K 5/00* (2013.01); *H04W 12/08* (2013.01)

(58) Field of Classification Search
CPC ....... H04L 9/321; H04L 63/102; H04W 12/06
See application file for complete search history.

(56) References Cited

U.S. PATENT DOCUMENTS

2006/0196931 A1* 9/2006 Holtmanns ........ G06Q 20/3552
235/380
2010/0242100 A1* 9/2010 Korhonen ........... H04L 63/0884
726/5

FOREIGN PATENT DOCUMENTS

WO    2009102248 A1    8/2009

OTHER PUBLICATIONS

International Preliminary Report on Patentability and Written Opinion in English dated Oct. 2, 2013 for corresponding International Application No. PCT/FR2012/050632, filed Mar. 27, 2013, 7 pages.

(Continued)

*Primary Examiner* — Brandon Hoffman
*Assistant Examiner* — Wasika Nipa
(74) *Attorney, Agent, or Firm* — David D. Brush; Westman, Champlin & Koehler, P.A.

(57) ABSTRACT

A method is provided for putting in place a security association of GBA type for a terminal. The method includes the following steps, executed in a network access server, following the receipt of a request for attachment to the network from the terminal: dispatching a request to a subscriber server, receipt of a response including an indication that the user profile associated with the terminal supports the security association of GBA type.

4 Claims, 2 Drawing Sheets

(56) References Cited

OTHER PUBLICATIONS

International Search Report and Written Opinion dated Aug. 3, 2012 for corresponding International Application No. PCT/FR2012/050632, filed Mar. 27, 2012.
Digital Cellular Telecommunications System (Pahse 2+); Universal Mobile Telecommunications System (UMTS); LTE; Generic Authentication Architecture (GAA); Generic Bootstrapping Architecture (GBA) (3GPP TS 33.220 version 9.3.0 Release 9), Technical Specification, European Telecommunications Standards Institute (TSI), 650, Route Des Lucioles; F-06921 Sophia-Antipolis; France vol. 3GPP SA 3, No. V9.3.0, Jul. 1, 2010 (Jul. 1, 2010), XP014047407.
French Search Report and Written Opinion dated Dec. 14, 2011 for corresponding French Application No. 1152709.

* cited by examiner

PUTTING IN PLACE A SECURITY ASSOCIATION OF GBA TYPE FOR A TERMINAL IN A MOBILE TELECOMMUNICATIONS NETWORK

CROSS-REFERENCE TO RELATED APPLICATIONS

This Application is a Section 371 National Stage Application of International Application No. PCT/FR2012/050632, filed Mar. 27, 2012, which is incorporated by reference in its entirety and published as WO 2012/168603 on Dec. 13, 2012, not in English.

FIELD OF THE INVENTION

The field of the invention is that of telecommunications, and more particularly telecommunications by mobile networks.

BACKGROUND OF THE DISCLOSURE

3GPP has defined an architecture called GBA (Generic Bootstrapping Architecture) the aim of which is to allow the authentication of a mobile terminal so as to create a security association between the mobile terminal and an application.

This architecture comprises a Bootstrapping Function Server, BSF, and relies on a protocol termed AKA of identification keys.

In the course of the authentication procedure, the terminal, furnished with a SIM card, uses a connection based on the http protocol to authenticate itself to the bootstrapping function server BSF. The general principle is as follows:

The result of the authentication is a security key that is valid for a duration determined by the server. The server also supplies the terminal with a session identifier associated with the security key as well as the duration of validity of the key.

When the terminal subsequently opens an IP connection with an application, it indicates to this application that it desires to be authenticated according to the GBA technique by supplying it with the session identifier.

The application contacts the BSF server to supply it with the session identifier. The BSF server responds to it by supplying it with a new key derived from the security key and from the name of the application. The terminal performs the same operations. Thus the terminal and the application employ one and the same key that they can use to authenticate themselves mutually and to secure the IP connection between them.

This procedure implies that the terminal opens its http browser so as to be able thereafter to open an IP connection with the application, this connection not necessarily being based on the http protocol.

Moreover, the mobile terminal has previously authenticated itself with a network access server, upon its attachment to the network. There is therefore dual-authentication of the mobile terminal, once upon its attachment to the network and then a second time to create a security association with an application.

SUMMARY

An embodiment of the present invention relates to a method of putting in place a security association of GBA type for a terminal, comprising the following steps, executed in a network access server, subsequent to the receipt of a request for attachment to the network from the terminal:
   dispatching of a request to a subscriber server,
   reception of a response comprising an indication that the user profile associated with the terminal supports the security association of GBA type.

By virtue of the invention, the authentication of the terminal for the security association of GBA type is coupled with the operations performed upon the attachment of the terminal to the network, instead of being performed separately and subsequent to them.

Thus, the signaling sent by the terminal is reduced overall, and the use of the security association of GBA type is thus simplified.

In particular, the terminal does not need to open a specific http connection in order to authenticate itself for the security association of GBA type.

The invention also relates to a method of putting in place a security association of GBA type for a terminal, characterized in that it comprises the following steps, executed in a subscriber server:
   reception of a request from a network access server, subsequent to the receipt by the network access server of a request for attachment to the network from the terminal,
   dispatching of a response comprising an indication that the user profile associated with the terminal supports the security association of GBA type.

By virtue of the invention, if the user profile associated with the terminal supports the security association of GBA type, the network access server and the subscriber server dialog at the moment of attachment of the terminal to the network, so that the subscriber server indicates to the network access server that the user profile associated with the terminal supports the security association of GBA type. Thus, the network access server has this information that it can exploit to establish the security association.

According to a preferred characteristic, the response comprising an indication that the user profile associated with the terminal supports the security association of GBA type is of "Diameter" type.

The "Diameter" protocol is one of the AAA protocols that is commonly used.

The invention also relates to a network access server adapted for putting in place a security association of GBA type for a terminal, comprising means for receiving a request for attachment to the network from the terminal, and furthermore comprising:
   means for dispatching a request to a subscriber server,
   means for receiving a response comprising an indication that the user profile associated with the terminal supports the security association of GBA type.

The invention also relates to a subscriber server hosting the data of user profiles associated with terminals, characterized in that, if a user profile associated with a terminal supports the security association of GBA type, then the subscriber server stores an indication of this characteristic.

According to a preferred characteristic, the subscriber server comprises means for receiving a request dispatched by a network access server subsequent to a request for attachment to the network from the terminal, and, if the user profile associated with the terminal supports the security association of GBA type, it comprises means for dispatching a response comprising an indication of this characteristic.

These devices present advantages analogous to those of the method presented above.

In a particular embodiment, the various steps of the method according to the invention are determined by instructions of computer programs.

Consequently, the invention is also aimed at a computer program on an information medium, this program being able to be implemented in a computer, this program comprising instructions adapted to the implementation of the steps of a method such as described hereinabove.

This program can use any programming language, and be in the form of source code, object code, or of code intermediate between source code and object code, such as in a partially compiled form, or in any other desirable form.

The invention is also aimed at an information medium readable by a computer, and comprising instructions of the above-mentioned computer programs.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can in particular be downloaded from a network of Internet type.

Alternatively, the information medium can be an integrated circuit in which the program is incorporated, the circuit being adapted to execute or to be used in the execution of the method in question.

BRIEF DESCRIPTION OF THE DRAWINGS

Other characteristics and advantages will become apparent on reading preferred embodiments described with reference to the figures in which.

DETAILED DESCRIPTION OF ILLUSTRATIVE EMBODIMENTS

Figure 1:
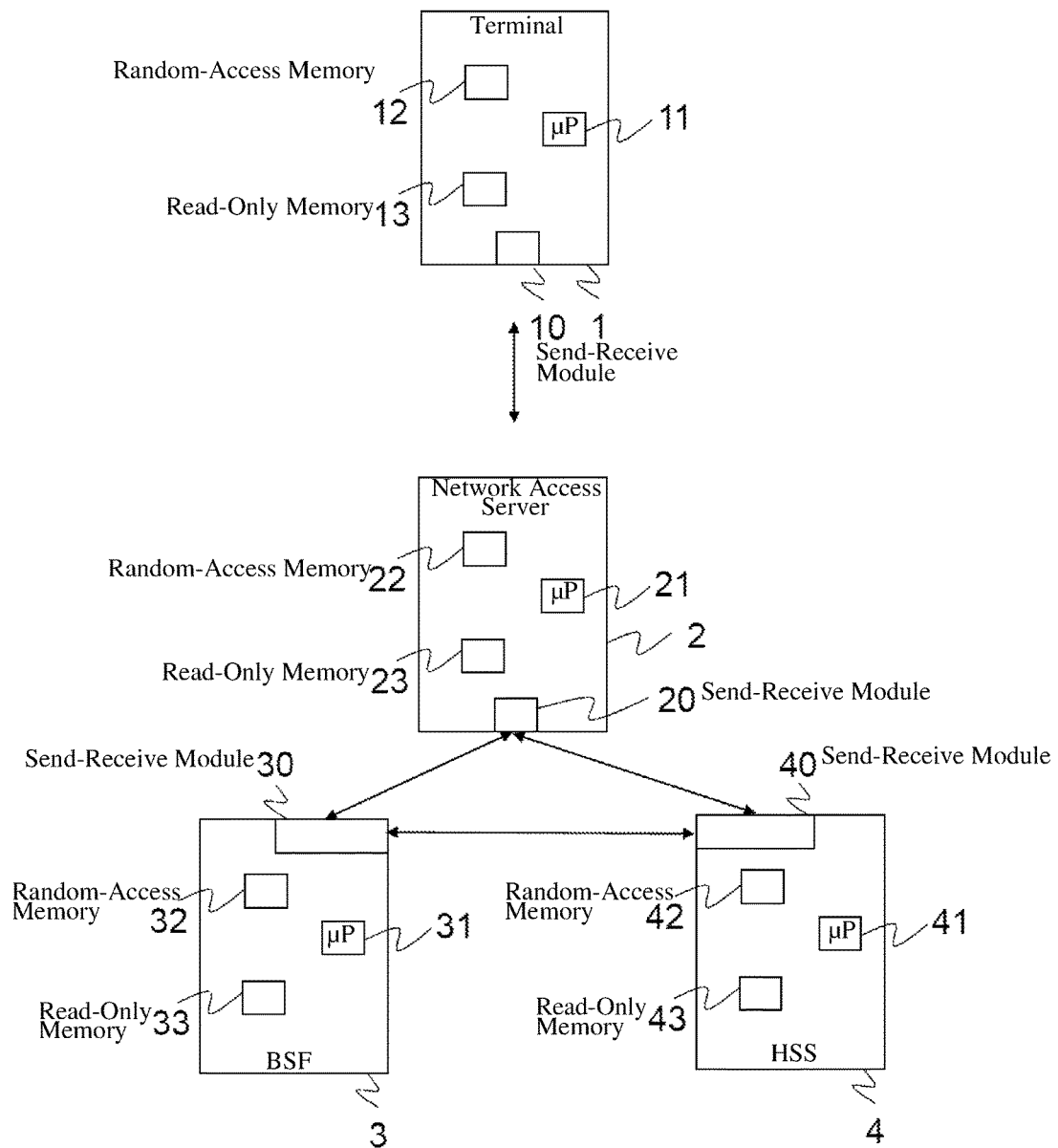
FIG. 1 represents in a schematic manner the items of equipment of a mobile telecommunication network that are involved in the present invention.

According to one embodiment of the invention represented in FIG. 1, the items of equipment implementing the invention are a mobile terminal 1, a network access server 2, a bootstrapping function server 3, termed BSF, and a subscriber server 4, termed HSS (Home Subscriber Server).

The invention is implemented for an access of GPRS type (General Packet Radio Service). In this case, the network access server 2 is a service GPRS support Node, termed SGSN (Serving GPRS Support Node).

In another embodiment, the invention is implemented in a network of LTE/EPC (Long Term Evolution/Evolved Packet Core) type. In this case, the network access server 2 is a server termed MME (Mobility Management Entity).

The mobile terminal 1 can be, for example, a mobile telephone terminal, a laptop computer, a digital personal assistant, or other. In the example represented the mobile terminal 1 is a mobile telephone terminal belonging to a user.

As represented in FIG. 1, the mobile terminal 1 comprises a send-receive module 10 configured to send and receive data in particular to and from the network access server 2.

It also comprises a processor 11, a random-access memory 12 and a read-only memory 13.

The network access server 2 has the conventional structure of a computer. It comprises a processor 21, a random-access memory 22 and a read-only memory 23. It comprises a send-receive module 20 configured to communicate with the mobile terminal 1, the BSF bootstrapping function server 3 and the HSS subscriber server 4.

The network access server is adapted for putting in place a security association of GBA type for a terminal. It comprises means for receiving a request for attachment to the network from the terminal.

According to the invention, it furthermore comprises:
means for dispatching a request to a subscriber server,
means for receiving a response comprising an indication that the user profile associated with the terminal supports the security association of GBA type.

The BSF bootstrapping function server 3 has the conventional structure of a computer. It comprises a processor 31, a random-access memory 32 and a read-only memory 33. It comprises a send-receive module 30 configured to communicate with the network access server 2 and the HSS subscriber server 4.

The HSS subscriber server 4 has the conventional structure of a computer. It comprises a processor 41, a random-access memory 42 and a read-only memory 43. It comprises a send-receive module 40 configured to communicate with the network access server 2 and the BSF bootstrapping function server 3.

The subscriber server 4 hosts the data of user profiles associated with terminals. According to the invention, if a user profile associated with a terminal supports the security association of GBA type, then the subscriber server stores an indication of this characteristic.

The subscriber server according to the invention comprises means for receiving a request dispatched by a network access server subsequent to a request for attachment to the network from the terminal, and, if the user profile associated with the terminal supports the security association of GBA type, it comprises means for dispatching a response comprising an indication of this characteristic.

Figure 2:
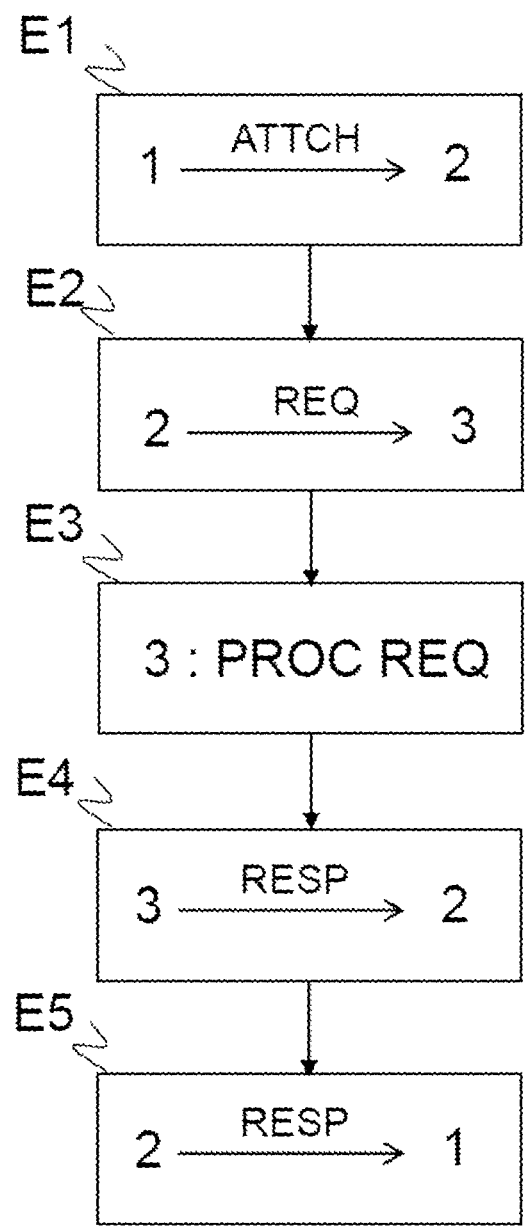
FIG. 2 represents the steps of a method of putting in place a security association of GBA type for a terminal, according to the invention.

According to one embodiment of the invention, represented in FIG. 2, the method of putting in place a security association of GBA type for the mobile terminal 1 comprises steps E1 to E5.

The exchanges between the network access server 2 and the BSF server 4 are for example based on the Diameter protocol.

In step E1, the mobile terminal 1 requests its attachment to the network access server 2 which processes this request. The exchanges specific to attachment to the network are conventional and will not be detailed here.

The network access server 2 processes the mobile terminal 1 attachment request and performs an authentication of the terminal, during which procedure it interrogates the HSS server 4 to recover the authentication parameters AKA.

The HSS server 4 is the centralized base hosting the data of the user profile associated with the mobile terminal 1. If this profile supports the security association of GBA type, then the HSS server 4 also stores an indication of this characteristic.

The HSS server 4 responds to the network access server 2. It is assumed that the mobile terminal 1 supports the security association of GBA type. The HSS server 4 therefore inserts this information into its response to the network access server 2.

For example, if the Diameter protocol is used for the exchanges between the two servers, the indication that the mobile terminal 1 supports the security association of GBA type is added to the "Authentication-Information-Answer" command dispatched by the HSS server 4 to the network access server 2 in response to the authentication request. According to this protocol, a packet comprises a set of pairs termed AVP (Attribute-Value Pairs). A specific AVP pair "GBA-Support" is added in the following manner:

```
< Authentication-Information-Answer>::= < Diameter Header:
318, PXY, 16777251 >
          < Session-Id >
          [ Vendor-Specific-Application-Id ]
          [ Result-Code ]
          [ Experimental-Result ]
          { Auth-Session-State }
          { Origin-Host }
          { Origin-Realm }
          * [Supported-Features]
          [ Authentication-Info ]
          *[ AVP ]
          *[ Failed-AVP ]
          *[ Proxy-Info ]
          *[ Route-Record ]
          [ GBA-Support ]
```

The network access server 2 receives the response of the HSS server 4. In the following step E2, the network access server 2 interrogates the BSF server 3 to request the creation of a GBA security association. Accordingly, the network access server 2 generates a Diameter request in which it supplies the unique identifier, or International Mobile Subscriber Identity IMSI of the user of the mobile terminal 1. This request is dispatched to the BSF server 3.

A possible realization of the Diameter request initiated by the network access server 2 is as follows:

```
< GBA-Info-Request>::=<Diameter Header: xxx, REQ, PXY, yyyyy >
    < Session-Id >
    { Vendor-Specific-Application-Id }
    { Origin-Host }                      ; Address of Access server
    { Origin-Realm }                     ; Realm of Access server
    { Destination-Realm }                ; Realm of BSF
    [ Destination-Host ]                 ; Address of the BSF
    { User-Name }                        ; IMSI
    [ GBA_U-Awareness-Indicator ]        ; GBA_U awareness
    *[ AVP ]
    *[ Proxy-Info ]
    *[ Route-Record ]
```

In the following step E3, the BSF server 3 receives and processes the request of the network access server 2. It verifies that the unique identifier IMSI of the user of the mobile terminal 1 exists and is entitled to the GBA service. If this is the case, the BSF server 3 interrogates the HSS subscriber server 4 to recover the authentication parameters AKA. The HSS subscriber server 4 dispatches the authentication parameters AKA to the BSF server 3. The authentication parameters are in the form of an authentication vector, comprising a random value RAND generated by the HSS server 4, a token for authenticating the network AUTN making it possible to authenticate the network, an encryption key CK and an integrity key Ik.

After having received the authentication parameters AKA, the BSF server 3 forms a key Ks by concatenating the keys Ik and Ck, generates a session identifier B-TID and determines the duration of validity of the GBA session associated with the key Ks.

In the following step E4, the BSF server 3 generates and dispatches the response to the network access server 2 and supplies it with the following information: the random value RAND generated by the HSS, the token AUTN making it possible to authenticate the network, calculated by the HSS, the session identifier B-TID and the duration of validity of the key Ks.

A possible realization of the Diameter response supplied by the BSF server 3 to the network access server 2 is as follows:

```
< GBA-Info-Answer>::= < Diameter Header: xxx, PXY, yyyyy >
    < Session-Id >
    { Vendor-Specific-Application-Id }
    [ Result-Code ]
    [ Experimental-Result]
    { Origin-Host }                  ; Address of BSF
    { Origin-Realm }                 ; Realm of BSF
    [ User-Name ]                    ; IMPI
    { Transaction-Identifier }       ; B-TID
    [ RAND ]                         ; RAND
    [ AUTN ]                         ; AUTN
    [ Key-ExpiryTime ]               ; Time of expiry
    *[ AVP ]
    *[ Proxy-Info ]
    *[ Route-Record ]
```

In the following step E5, the network access server 2 receives and processes the response of the BSF server 3, recovers the GBA information and transmits it to the mobile terminal 1.

Accordingly, in the GPRS and LTE/EPC embodiments, the network access server 2 dispatches to the mobile terminal 1 a message ATTACH ACCEPT which is modified so as to comprise four optional information elements which will be interpreted by the mobile terminal 1 if it supports GBA authentication. Otherwise, these information elements will be ignored by the mobile terminal 1.

The additional information elements are:
the random value RAND,
the authentication token AUTN,
the session identifier B-TID and
the duration of validity of the key Ks.

Thus the mobile terminal 1 has the GBA authentication data, that it will be able to use subsequently, in a conventional manner, when it connects to an application.

The invention claimed is:

1. A method executed by a network access server, comprising:
   receiving a request from a terminal for attachment to a mobile network, the terminal supporting a security association of Generic Bootstrapping Architecture (GBA) type; and
   processing the request for attachment to the mobile network by performing the following acts, during attachment of said terminal to the mobile network:
      in response to the request for attachment, dispatching a request to a subscriber server for recovering authentication parameters;
      receiving a response from the subscriber server comprising an indication that a user profile associated with the terminal and stored by the subscriber server supports the security association of GBA type;
      in response to receiving the indication, putting in place the security association of GBA type for said terminal without any HTTP connection request from said terminal; and dispatching from the network access server to the terminal a message comprising GBA authentication data for the security association, configured for subsequent use by the terminal for connecting to an application.

2. The method as claimed in claim 1, wherein the response comprising an indication that the user profile associated with the terminal supports the security association of GBA type is of "Diameter" type.

3. A network access server, comprising:
a send-receive module;
a non-transitory computer-readable medium comprising instructions stored thereon; and
a processor configured by the instructions to execute the following acts by the network access server:
receiving a request from a terminal through the send-receive module for attachment to a mobile network, the terminal supporting a security association of Generic Bootstrapping Architecture (GBA) type; and
processing the request for attachment to the mobile network by performing the following acts, during attachment of said terminal to the mobile network:
in response to the request for attachment, dispatching a request through the send-receive module to a subscriber server for recovering authentication parameters;
receiving a response through the send-receive module from the subscriber server comprising an indication that a user profile associated with the terminal and stored by the subscriber server supports the security association of GBA type;
in response to receiving the indication, putting in place the security association of GBA type for said terminal, without any HTTP connection request from said terminal; and
dispatching a message through the send-receive module to the terminal, the message comprising GBA authentication data for the security association, configured for subsequent use by the terminal for connecting to an application.

4. A non-transmissible computer-readable recording medium on which is recorded a computer program comprising instructions for execution of a method when the instructions are executed by a processor in a network access server, wherein the instructions comprise:
instructions that configure the network access server to receive a request from a terminal for attachment to a mobile network, the terminal supporting a security association of Generic Bootstrapping Architecture (GBA) type; and
instructions that configure the network access server to process the request for attachment to the mobile network by performing the following acts, during attachment of said terminal to the mobile network:
in response to the request for attachment, dispatching a request to a subscriber server for recovering authentication parameters;
receiving a response from the subscriber server comprising an indication that a user profile associated with the terminal and stored by the subscriber server supports the security association of GBA type;
in response to receiving the indication, putting in place the security association of GBA type for said terminal, without any HTTP connection request from said terminal; and
dispatching from the network access server to the terminal a message comprising GBA authentication data for the security association, configured for subsequent use by the terminal for connecting to an application.

* * * * *